United States Patent [19]

VanderWerf

[11] 4,168,578
[45] Sep. 25, 1979

[54] FOUR WAY CORNER LEVEL
[75] Inventor: Robert H. VanderWerf, San Rafael, Calif.
[73] Assignee: Vy-Dawn, Incorporated, San Rafael, Calif.
[21] Appl. No.: 885,656
[22] Filed: Mar. 13, 1978
[51] Int. Cl.² ............................................. G01C 9/34
[52] U.S. Cl. ....................................... 33/371; 33/347
[58] Field of Search ......................... 33/347, 370–373, 33/382, 340

[56] References Cited
U.S. PATENT DOCUMENTS

| | | | |
|---|---|---|---|
| 1,644,456 | 10/1927 | Winter | 33/342 X |
| 2,624,953 | 1/1953 | Newcomb | 33/372 |
| 3,028,679 | 4/1962 | Christy | 33/342 X |
| 3,545,091 | 12/1970 | Sebastiani | 33/372 |
| 3,820,249 | 6/1974 | Stone | 33/347 |
| 3,859,002 | 1/1975 | Sauey | 33/370 X |

FOREIGN PATENT DOCUMENTS 1934717  7/1968  Fed. Rep. of Germany ............. 33/347

*Primary Examiner*—Charles E. Phillips
*Attorney, Agent, or Firm*—Neil F. Markva

[57] ABSTRACT

A four way corner level is provided with a first run, a second run extending perpendicular to the first run, and a third run terminating in a handle member extending from the external apex of the first and second runs. Vertical and horizontal level means are provided on the external sides of the first and second runs and magnetic attaching means may be provided on the internal sides of the first and second runs.

14 Claims, 2 Drawing Figures

U.S. Patent  Sep. 25, 1979  4,168,578
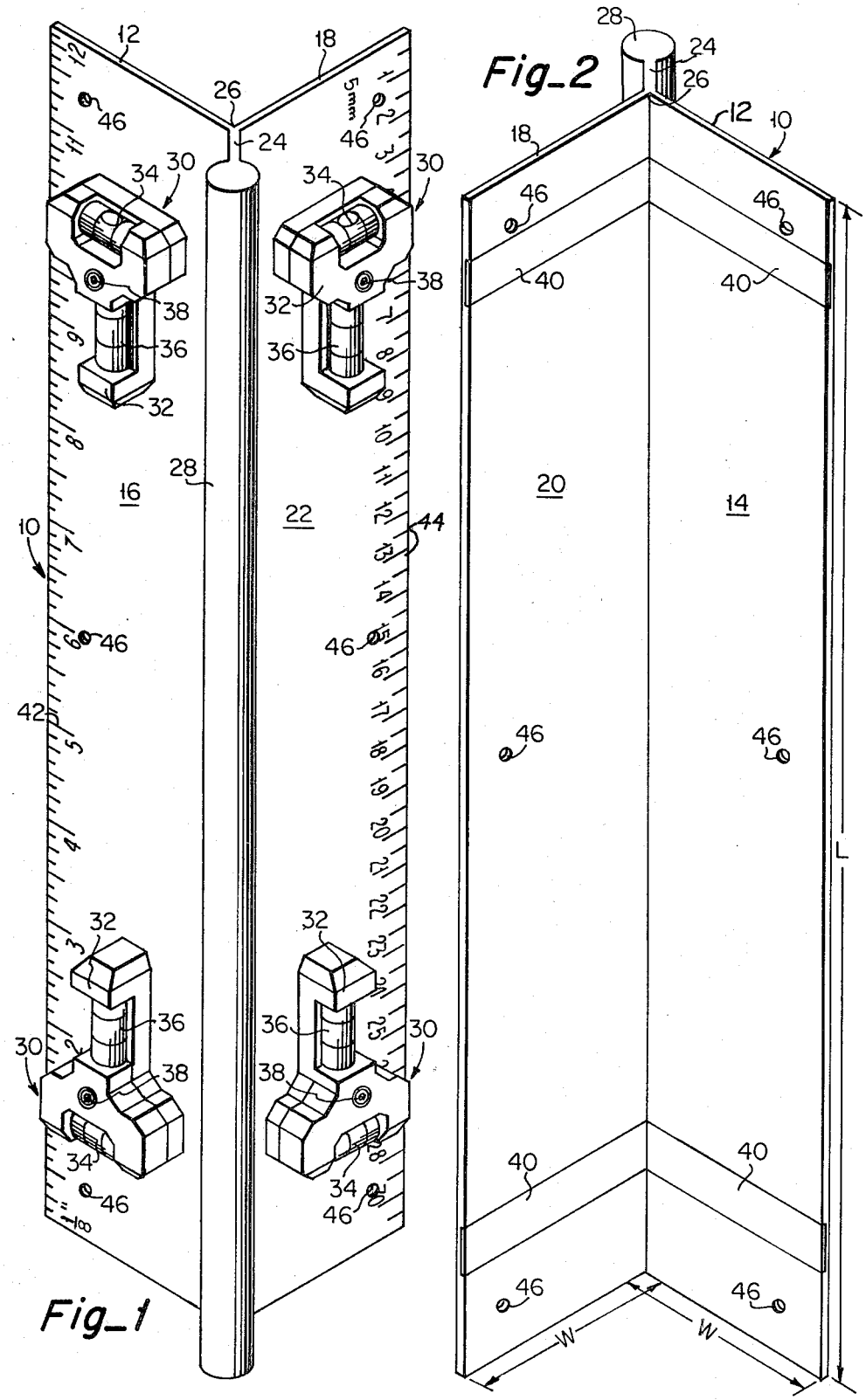
Fig_1  Fig_2

FOUR WAY CORNER LEVEL

SUMMARY OF THE INVENTION

A four way corner level can be applied either vertically or horizontally to interior or exterior 90° dihedral corners or angles. The instrument can also be applied to flat, round vertical or horizontal surfaces with the same leveling and plumbing accuracy and ease. The level means of the instrument may be read from any visible horizontal or vertical plane when in use.

BACKGROUND OF THE INVENTION

It is common knowledge that construction costs have soared in recent years, far exceeding the rate of inflation. Raw material costs and labor rates have both contributed to this situation.

The present invention relates to a four way corner level which is a time and labor saving device in that it allows one person to do what it takes two people to accomplish with the standard level now on the market. The instrument also releases the operator from a series of four or more applications to any vertical or horizontal object before completing the leveling or plumbing of two different planes, thereby allowing the operator to level and/or plumb two planes simultaneously.

Use of the present invention has resulted in 600% to 800% savings in labor costs. The four way corner level can be used by individuals in the highly skilled trade areas, craftsmen in the construction industry, workers in public utility companies, home owners and general handymen.

The following U.S. patents include the closest prior art of which the inventor is aware:
U.S. Pat. Nos. 2,534,940; 2,624,953; 2,728,989; 2,833,043; 2,998,655.
None of these patents has the versatility inherent in the four way corner level of the present invention.

OBJECTS OF THE INVENTION

It is the primary object of the present invention to provide a new four way corner level.

Another object is to provide a four way corner level which in operation results in the saving of labor and time.

A further object is to provide structure which is inexpensive to manufacture and long lasting in usage.

BRIEF DESCRIPTION OF THE DRAWINGS

FIG. 1 is a perspective view of the four way corner level showing the external sides having vertical and horizontal level means thereon.

FIG. 2 is a perspective view of the four way corner level showing the internal sides having magnetic attaching means thereon.

DESCRIPTION OF THE PREFERRED EMBODIMENT

Referring to the drawing, there is shown the four way corner level of this invention, generally indicated 10, which is adaptable for use on a variety of structures and objects in either the horizontal or vertical plane. The four way corner level 10 has a first run 12 having an internal side 14 (FIG. 2) and an external side 16 (FIG. 1), and a second run 18 extending perpendicular from the first run 12 and having an internal side 20 and an external side 22. A third run 24 extends from the external apex 26 of the first run 12 and second run 18 and terminates in handle member 28 which can be round in shape for ease in handling and grasping.

As can be seen, the third run 24 is equidistant from the first run 12 and the second run 18 and the first run 12 and second run 18 are of equal length L and width W. The third run 24 has a length equal to the first run 12 and second run 18, although this is not necessary for all applications of the instrument.

The four way corner level can be manufactured to any desired length, depending of course upon the objects and installation involved. The runs can be made of any durable lightweight material such as aluminum, steel or plastic. Aluminum extrusion is one desired economical process of manufacturing.

If aluminum is used, anodizing and etching of the instrument to a gold or similar color prevents sun glare while the instrument is used outdoors, thus providing a safety factor to the eyes. Additionally, the etching along with careful use reduces any possible surface marring. Any unique color also makes the instrument easily identifiable.

To level and/or plumb, level means generally indicated 30 are provided on the external sides 16 and 22 of the first and second runs, 12 and 18, respectively. The level means 30 includes a T-shaped case 32 having openings therein for spirit vials 34 and 36 which are positioned at right angles to each other and parallel to their respective leveling or plumbing interior angle or outside edge. That is, vial 36 is parallel to the short edge of the run and vial 34 is parallel to the long edge of the run. Two cases 32 are on each exterior side placed opposite each other so as to be read from either side of the instrument and are secured to the exterior side by appropriate means such as adhesive or a counter-sunk machine screw 38. The T-shaped cases 32 holding the spirit vials 34 and 36 have been designed and positioned so that the spirit vials may be read from any visible horizontal or vertical plane when the instrument is applied to any surface or object. Altogether, there are five visible planes from which to view the instrument, either separately or corporately. Because of the continuous handle 28 and the equal placement of the cases 32, the instrument is also reversible, which feature saves additional time and labor.

As is evident from the drawings, the runs 12 and 18 have internal sides 14 and 20, respectively, extending parallel to the external sides 16 and 22, respectively. Further, the first and second runs 12 and 18 have parallel outer longitudinal edges and parallel end edges as shown. The level means 30 project outwardly from the external sides 16 and 22 and are viewable from any vertical and horizontal direction. Level means are clearly effective to simultaneously level along a horizontal plane and plumb along a vertical plane. It is also possible to simultaneously plumb two planes enabling the straightening of an object such as a post quickly and efficiently with one person.

As shown, level means 30 includes a pair of spirit vials 34 with each longitudinal axis thereof being disposed parallel to the end edges and a pair of spirit vials 36 with the longitudinal axis of each being disposed parallel to the outer edges of the level. The parallel end edges are located in a plane normal to a plane containing the parallel outer longitudinal edges as clearly shown. With the two pairs of spirit vials on each external side 16 and 22, the level means is therefore effectively disposed thereon to cause the level to be reversible end to end and outer edge to outer edge. In the specific embodiment of FIGS. 1 and 2, the first, second and third runs 12, 18 and 24, respectively, define a continuous one-piece construction.

As is further evident from the disclosure herein, spirit vials 34 and 36 are the well known barrel spirit vials which are commercially referred to by the trademark MONOVIALS in the prior art. As shown, one spirit vial of each of said first pair of barrel spirit vials 36 and of said second pair of barrel spirit vials 34 is positioned at opposed ends of the external sides 16 and 22.

Magnetic attaching strips 40 are provided on and adhered to internal sides 14 and 20, perpendicular to the length of the instrument and flush with the sides 14 and 20. These strips 40 secure the instrument to any metal surface or object, thus making the instrument releasably attached, thereby freeing the hands of the operator to manipulate the surface or object as desired without the help of an additional laborer. The strips 40 are spaced apart from the spirit vials 34 and 36 so as not to interfere with the operation thereof.

Measuring means are also provided on the external sides 16 and 22. As shown in FIG. 1, side 16 has inch measurements 42 thereon and side 22 has metric measurements 44 thereon. These measurements can run the entire length of the instrument and can be varied from run to run, as desired. The measurements 42 and 44 allow the operator to mark heights and lengths for cutting or reference points simultaneously with the leveling or plumbing work. The instruments can also be used as a straight edge or guide for cutting or marking horizontally placed objects.

The first run 12 and second run 18 have at least one aperture 46 (FIG. 2) therein to provide the operator with a means of attaching the instrument with nails or the like to wooden or related material surfaces and objects, once again freeing the use of the hands.

On objects and surfaces which are not wood or metal, the four way corner level may be secured thereto with a pliable or elastic strap, cord, or tension spring wrapped around the object or surface with each end having a hook or the like engaging handle 28.

It can thus be seen that the four way corner level of the present invention can be used in association with many objects and structures such as pipes, electrical conduit, sheet metal, framing carpentry, cabinetry, various equipment and machinery, fence posts, appliances, built-in furniture and masonry. The four way corner level can be applied to interior and exterior vertical corners and interior and exterior horizontal corners. In addition, the device can be applied to flat surfaces, the flat surface being the hypotenuse of the right angle since the widths of the first and second runs are equal.

It will be obvious that numerous modifications and variations are possible for the above described four way corner level within the scope of the present invention. The foregoing description, as setting forth various constructional and operational details for purposes of understanding only, is not to be taken as limiting the scope of the present invention which is defined only by the following claims.

I claim:
1. A four way corner level comprising:
(a) a first run having an internal side parallel to an external side,
(b) a second run extending perpendicular from said first run and having an internal side parallel to an external side,
(c) said first and second runs having outer longitudinal edges extending in parallel longitudinal directions and having parallel end edges,
(d) a third run extending from the external apex of the first and second runs and including means for handling said level during use, and
(e) level means disposed on each of the external sides of said first and second runs,
(f) said level means projecting outwardly from said external sides and including a first pair of barrel spirit vials located on each said external side with the longitudinal axes thereof disposed parallel to said outer edges and a second pair of barrel spirit vials located on each said external side with the longitudinal axes thereof disposed parallel to said end edges,
(g) one spirit vial of each of said first and second pair of spirit vials being positioned at opposed ends of its respective external side to cause the level to be reversible end-to-end and outer edge-to-outer edge,
(h) said level means being effective to simultaneously level along a horizontal plane and plumb along a vertical plane.
2. The level as defined in claim 1 wherein the third run terminates in an outer edge and the handling means includes a continuous handle extending along the length of the outer edge of the third run.
3. The level as defined in claim 1 wherein the third run in equidistant from the first and second runs.
4. The level as defined in claim 1 wherein magnetic attaching means are disposed on the internal sides of the first and second runs.
5. The level as defined in claim 1 wherein measuring means are located on the external sides of the first and second runs.
6. The level as defined in claim 1 wherein the first and second runs each have at least one aperture therein.
7. The level as defined in claim 1 wherein the first and second runs are of equal length.
8. The level as defined in claim 7 wherein the third run has a length equal to the first and second runs.
9. The level as defined in claim 1 wherein said level means includes a single container which holds one of each of said first and second pair of barrel spirit vials fixed in position with respect to each other.
10. The level as defined in claim 9 wherein said container comprises a T-shaped case.
11. The level as defined in claim 1 wherein said parallel end edges are located in planes normal to a plane containing said parallel outer longitudinal edges.
12. The level as defined in claim 1 wherein said first, second and third runs define a continuous one-piece construction.
13. The level as defined in claim 1 wherein said first and second runs have equal widths.
14. The level as defined in claim 1 wherein said third run terminates in a handle member having a circular cross section.

* * * * *